US008421755B2

United States Patent
Seelhammer et al.

(10) Patent No.: US 8,421,755 B2
(45) Date of Patent: Apr. 16, 2013

(54) CAPACITIVE TOUCH SENSOR WITH INTEGRAL EL BACKLIGHT

(75) Inventors: Mark A. Seelhammer, Chandler, AZ (US); Alan C. Thomas, Gilbert, AZ (US); David G. Pires, Phoenix, AZ (US); Walter J. Paciorek, Phoenix, AZ (US)

(73) Assignee: World Properties, Inc., Lincolnwood, IL (US)

( * ) Notice: Subject to any disclaimer, the term of this patent is extended or adjusted under 35 U.S.C. 154(b) by 2202 days.

(21) Appl. No.: 11/333,166

(22) Filed: Jan. 17, 2006

(65) Prior Publication Data
US 2007/0165004 A1 Jul. 19, 2007

(51) Int. Cl.
*G06F 3/041* (2006.01)
(52) U.S. Cl.
USPC .......................................................... 345/173
(58) Field of Classification Search ........... 345/173–184
See application file for complete search history.

(56) References Cited

U.S. PATENT DOCUMENTS

| | | | |
|---|---|---|---|
| 3,482,241 A | 12/1969 | Johnson | 340/337 |
| 5,313,141 A | 5/1994 | Kimball | 315/169.3 |
| 5,378,403 A * | 1/1995 | Shacklette | 252/500 |
| 5,486,738 A | 1/1996 | Saika et al. | 315/169.3 |
| 5,580,496 A | 12/1996 | Yukinobu et al. | 252/518 |
| 5,650,597 A * | 7/1997 | Redmayne | 178/18.06 |
| 5,950,808 A | 9/1999 | Tanabe et al. | 200/314 |
| 6,477,390 B1 * | 11/2002 | Gum et al. | 455/550.1 |
| 6,535,200 B2 | 3/2003 | Philipp | 345/168 |
| 6,627,689 B2 * | 9/2003 | Iino et al. | 524/404 |
| 6,822,640 B2 | 11/2004 | Derocher | 345/173 |
| 2005/0206623 A1 * | 9/2005 | Hein et al. | 345/173 |
| 2007/0085838 A1 * | 4/2007 | Ricks et al. | 345/173 |

* cited by examiner

*Primary Examiner* — Liliana Cerullo
(74) *Attorney, Agent, or Firm* — Cantor Colburn LLP

(57) ABSTRACT

A personal electronic device includes a programmable display and a programmable keypad, wherein at least one of the programmable display and the programmable keypad includes a capacitive touch sensor and an EL panel in a unitary structure. A conductive layer shields the capacitive touch sensor from the EL panel and can be a separate layer or be incorporated into either the capacitive sensor or the EL panel. The conductive layer includes antimony tin oxide (ATO), other conductive oxide, or a conductive polymer, such as Orgacon™ 3010.

14 Claims, 4 Drawing Sheets

CAPACITIVE TOUCH SENSOR WITH INTEGRAL EL BACKLIGHT

FIELD OF THE INVENTION

This invention relates to thick film electroluminescent (EL) lamps and, in particular, to an EL panel backlighting a capacitive touch sensor.

Glossary

As used herein, an EL "panel" is a single substrate including one or more luminous areas, wherein each luminous area is an EL "lamp." An EL panel can back-light plural capacitive switches but the lamps need not have a 1:1 correspondence with the switches.

A "thick film" EL lamp refers to one type of EL lamp and "thin film" EL lamp refers to a different type of EL lamp. The terms only broadly relate to actual thickness and actually identify distinct disciplines. A thin, thick film EL lamp is not a contradiction in terms and such a lamp is considerably thicker than a thin film EL lamp.

A "graphic" can be text, a symbol, an arbitrary shape, or some combination thereof. A graphic can be translucent, shaded, colored, a silhouette or outline, or some combination thereof.

A "phosphor layer" is not restricted to a single phosphor and does not exclude cascading phosphors or dyes for color enhancement.

"Ground" does not mean earth ground but means circuit ground or "common."

BACKGROUND OF THE INVENTION

An EL lamp is essentially a capacitor having a dielectric layer between two conductive electrodes, one of which is transparent. The dielectric layer includes a phosphor powder or there is a separate layer of phosphor powder adjacent the dielectric layer. The phosphor powder emits light in the presence of a strong electric field, using very little current.

A modern EL lamp is a thick film device, typically including a transparent substrate of polyester or polycarbonate material having a thickness of about 7.0 mils (0.178 mm.). A transparent, front electrode of indium tin oxide (ITO) or indium oxide is vacuum deposited onto the substrate to a thickness of 1000 Å or so. A phosphor layer is screen printed over the front electrode and a dielectric layer is screen printed over phosphor layer. A rear electrode is screen printed over the dielectric layer. Other methods for making an EL lamp can be used instead, e.g. roll coating.

The inks used for making an EL lamp include a binder, a solvent, and a filler, wherein the filler determines the nature of the printed layer. A typical solvent is dimethylacetimide (DMAC) or ethylbutylacetate (EB acetate). The binder is typically a fluoropolymer such as polyvinylidene fluoride/hexafluoropropylene (PVDF/HFP), polyester, vinyl, or epoxy. A front electrode can be vacuum deposited (sputtered) ITO or ITO particles in an ink. A phosphor layer is typically deposited from a slurry containing a solvent, a binder, and zinc sulphide particles. A dielectric layer is typically deposited from a slurry containing a solvent, a binder, and barium titanate ($BaTiO_3$) particles. A rear (opaque) electrode is typically deposited from a slurry containing a solvent, a binder, and conductive particles such as silver or carbon. Because the solvent and binder for each layer are chemically the same or similar, there is chemical compatibility and good adhesion between adjoining layers.

An EL lamp is used for backlighting switch pads and for backlighting displays because of the uniformity of the light. In a portable computer, cellular telephone, or other electronic device, a touch pad is often used as an interface for controlling the operation of the device. Typically, a touch pad includes a capacitive or resistive surface that is used to determine the position of a user's finger on the surface. Changes in resistance or capacitance are converted into a representation of the location of the touch. Many capacitive position sensors are disclosed in the art, e.g. U.S. Pat. No. 6,535,200 (Philipp). The Philipp patent discloses a "diaphanous" or "eggcrate-like" resistive layer/film made from "graphite-loaded paper" or "appropriate polymer based conductor." Although a broad range of resistivities is disclosed, $10^1$ to $10^6$ Ω/□, with a preferred resistivity "on the order of several tens of" Ω/□, it is not clear how to make the necessary resistive layer. U.S. Pat. No. 6,822,640 (Derocher) discloses using ITO as a conductive layer, does not disclose resistivity, but does disclose that the conductive layers are made from ink.

For EL panels, and especially for capacitive touch sensors, the conductive layers are critical to the operation of the device. A transparent, conductive layer of ITO sputtered onto a substrate are commercially available, which provides an economical way to obtain at least one electrode. The remaining electrodes are more expensive and more difficult to provide. As in any manufacturing process, the cost of a defect increases greatly as a product nears completion. Thus, there is a need not only to provide adequate conductive layers but to provide them as reliably and inexpensively as possible. Eliminating a conductive layer would be a great advantage.

It is known in the art to ground one layer of an EL lamp backlighting a capacitive touch sensor; e.g. see U.S. Pat. No. 6,822,640 (Derocher). It is also known to shield other electronics from an EL lamp with a grounded layer; e.g. see U.S. Pat. No. 5,486,738 (Saika et al.). There is no known disclosure of a unitary structure including touch sensor and an EL lamp backlighting the sensor. The structures of the prior art are stacked elements, which are necessarily relatively thick.

In view of the foregoing, it is therefore an object of the invention to provide an improved EL backlit, capacitive touch sensor.

Another object of the invention is to provide improved conductive layers for an EL backlit, capacitive touch sensor.

A further object of the invention is to provide a personal electronic device having a capacitive sensor backlit by an EL panel.

Another object of the invention is to provide an EL panel for backlighting a capacitive sensor serving as both a switchpad and a display; i.e. as both an input device and an output device.

A further object of the invention is to provide a unitary capacitive touch sensor backlit by an EL panel.

SUMMARY OF THE INVENTION

The foregoing objects are achieved by the invention in which a personal electronic device includes a programmable display and a programmable keypad, wherein at least one of the programmable display and the programmable keypad includes a capacitive touch sensor and an EL panel in a unitary structure. A conductive layer shields the capacitive touch sensor from the EL panel and can be a separate layer or be incorporated into either the capacitive sensor or the EL panel. The conductive layer includes antimony tin oxide (ATO), other conductive oxide, or a conductive polymer, such as Orgacon™ 3010.

BRIEF DESCRIPTION OF THE DRAWINGS

A more complete understanding of the invention can be obtained by considering the following detailed description in conjunction with the accompanying drawings, in which.

The figures are not drawn to scale but merely illustrate various aspects of the invention.

DETAILED DESCRIPTION OF THE INVENTION

Figure 1:
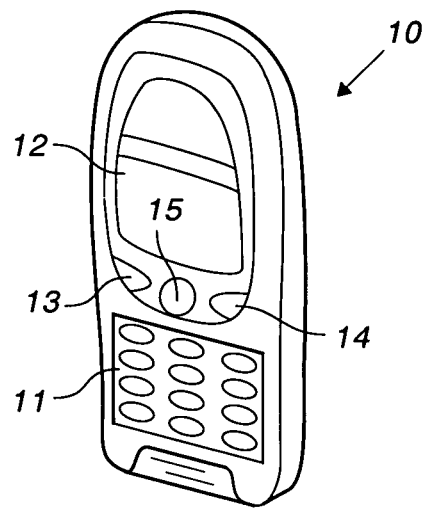
FIG. 1 is a perspective view of a cellular telephone having a backlit display and capacitive sensor constructed in accordance with the invention.

FIG. 1 is a perspective view of cellular telephone ("cellphone") 10, which includes touch-tone keypad 11 constructed in accordance with the invention. Cellular telephone 10 has several additional backlit areas, including display 12, and function keys 13, 14, and 15. While all such areas could be backlit by a single EL panel, at least two panels are preferred, one for the keypad and one for the remaining areas.

Figure 2:
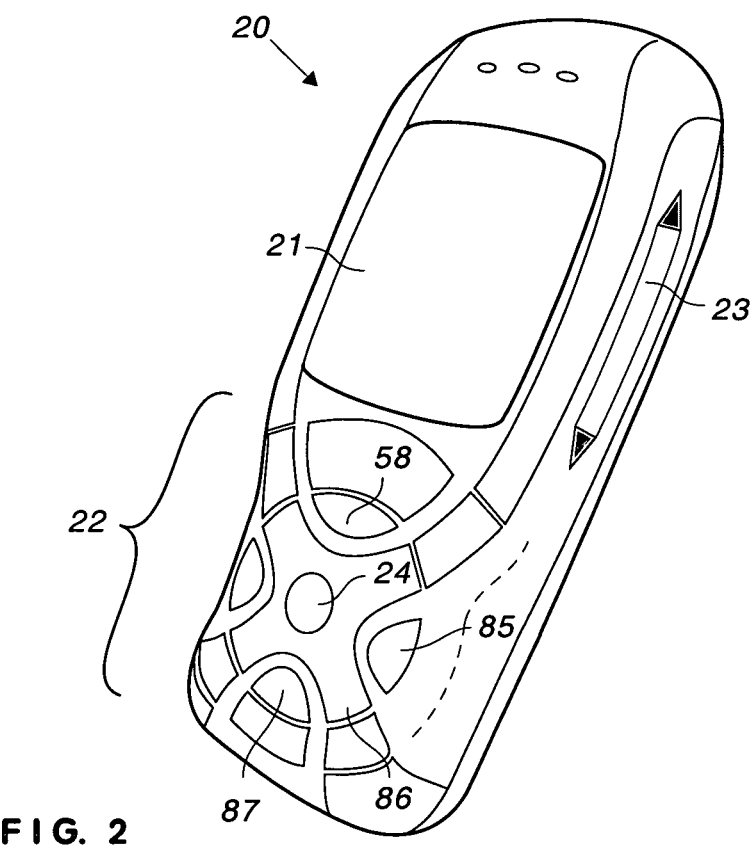
FIG. 2 is a perspective view of a personal electronic device having a backlit display and capacitive sensor constructed in accordance with the invention.

FIG. 2 is a perspective view of personal electronic device 20, which can include cellphone circuitry, clock and calendar functions, audio-visual recording and playback, and data storage, individually or combined. The more functions provided, the more complicated a display and keypad become. Thus, it is preferable to provide a programmable display for specific functions with separate controls for generic functions such as power on-off, motion, scrolling, selection or highlighting. Again, depending upon the functions contained in device 20, display 21 can be a fixed graphic overlay, a programmable liquid crystal display, or a programmable display using pixelated EL lamps. A liquid crystal display can include an overlay of a capacitive sensor.

Display 21 can provide a variety of images, such as an image of keypad 22, an image of a numeric keypad, an image of a "QWERTY" or typewriter keyboard, messages, or a menu, in addition to graphics. Scrolling is effected by slider 23, which is also a capacitive sensor. Central key 24 provides a selection function. All the keys in keypad 22 can be programmable, although at least some fixed function keys are preferred, such as a pair of keys for power on-off and a pair of keys for on-off hook, if cellphone capability is provided. In software terms, fixed keys trigger non-maskable interrupts of a microprocessor (not shown) within device 20, thereby assuring that certain basic operations will be performed on demand.

Figure 3:
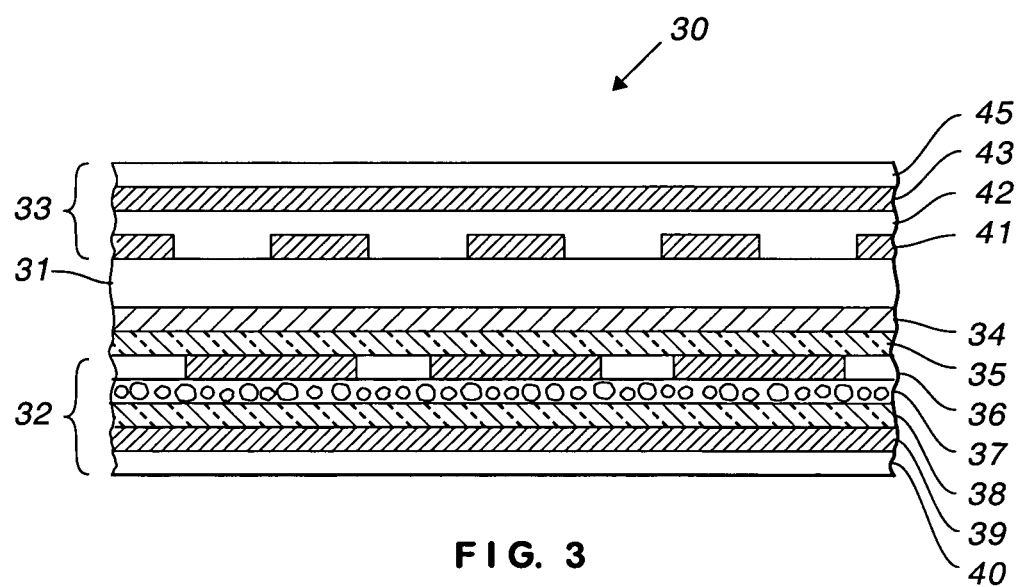
FIG. 3 is a cross-section of a backlit display and capacitive sensor constructed in accordance with the invention.

FIG. 3 is a cross-section of a combined EL panel and capacitive touch sensor constructed in accordance with a preferred embodiment of the invention. Backlit sensor 30 includes substrate 31, which is preferably a plastic sheet, such as polyethylene terephthalate (PET), having a thickness of 3-7 mils (0.076-0.178 mm). A substrate thickness of five mils (0.127 mm) or less is preferred for flexibility and, more importantly, a thin structure. As oriented in FIG. 3, EL panel 32 is on the lower surface of substrate 31 and capacitive sensor 33 is on the upper surface of the substrate, forming a unitary structure. The individual layers will be describe as though the panel and sensor were being constructed from substrate 31 outward. The panel and sensor need not be made this way. For example, EL lamp 32 and capacitive sensor 33 can be made separately and laminated to substrate 31. Lamination may require adhesive layers, which is not preferred because it increases thickness. Laminating with a tacky or partially cured layer is preferred.

Transparent conductive layer 34, such as vacuum coated ITO, is on the lower surface of substrate 31. Conductive layer 34 can cover substantially the entire substrate or be patterned, depending upon application. Insulation layer 35 overlies conductive layer 34 and is preferably a screen printed polymer resin. Conductive layer 36 forms a middle electrode and is preferably a screen printed conductive resin, such as Orgacon™ 3040 (Agfa-Gevært N.V.). Conductive layer 36 can be patterned, or not, as desired.

Phosphor layer 37 is preferably a screen printed polymer resin containing phosphor particles in suspension. Dielectric layer 38 overlies phosphor layer 37 and is preferably printed from polymer resin ink containing barium titanate in suspension. Conductive layer 39 is the rear electrode of EL panel 32 and is preferably screen printed from carbon bearing ink. Acrylic layer 40 overlies conductive layer 39 and provides protection from abrasion, in addition to being an electrical insulator.

Figure 4:
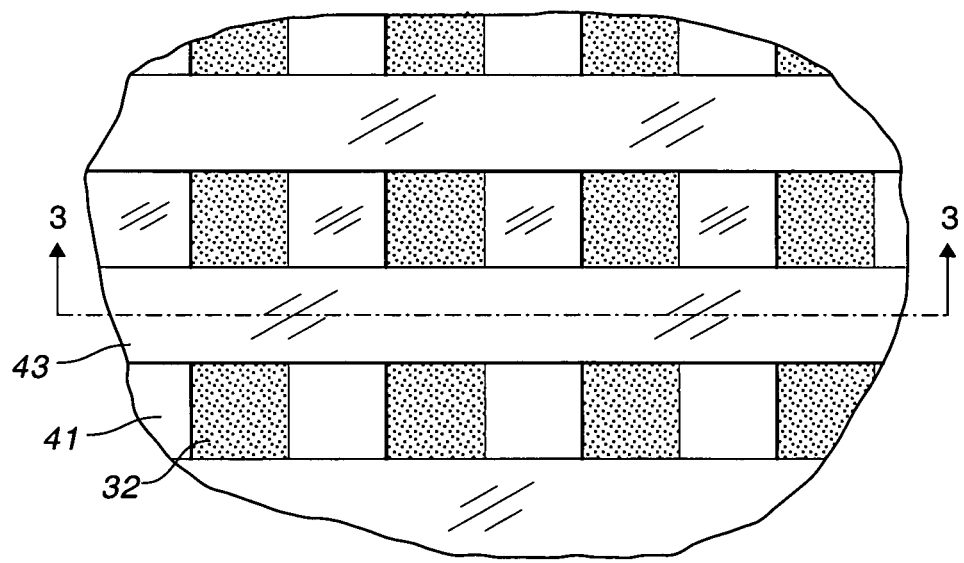
FIG. 4 is a plan view of a portion of the display and sensor illustrated in FIG. 3.

The upper surface of substrate 31, as the layers are arranged in FIG. 3, is at least partially covered by conductive electrode 41, which preferably is made by screen printing a conductive ink containing PEDOT/PSS (Poly-3,4-ethylenedioxythiophene/polystyrenesulfonic acid). Other conductive resins or resins containing particles of conductive metal oxides can be used instead. Overlying conductive electrode 41 is insulating, acrylic layer 42. Overlying insulating layer 42 is conductive layer 43, which is preferably the same material as conductive layer 41. As illustrated in FIG. 4, layers 41 and 43 are patterned to provide a plurality of areas of overlap, forming a plurality of capacitors. Acrylic layer 45 (FIG. 3) overlies conductive layer 43 and provides a clear, hard coating for the sensor.

The three electrode structure, including layers 34, 36, and 39, provide electrical isolation of the EL panel from other electronics, including capacitive sensor 33 and whatever circuitry may by underneath layer 39.

As known in the art, a single conductive layer exhibits a capacitance relative to a human body, which acts as a sink for electric charge. The conductive layers 41 and 43 form a complex web of capacitances, of which the areas of overlap exhibit the greatest capacitance. Determining the location of a touch is a matter of sensing the capacitance on the several stripes in layer 41 and the several stripes in layer 43, yielding the location of the touch in an X-Y coordinate system. The electronics for this function are known in the art; e.g. see U.S. Pat. No. 3,482,241 (Johnson).

Not shown in FIG. 3 are bus bars. These are thicker, peripheral, conductive layers that make contact with at least one edge of the electrodes in capacitive sensor 33 and EL panel 32 to provide low resistance paths to external leads. The structure and arrangement of bus bars are not part of the invention.

Figure 5:
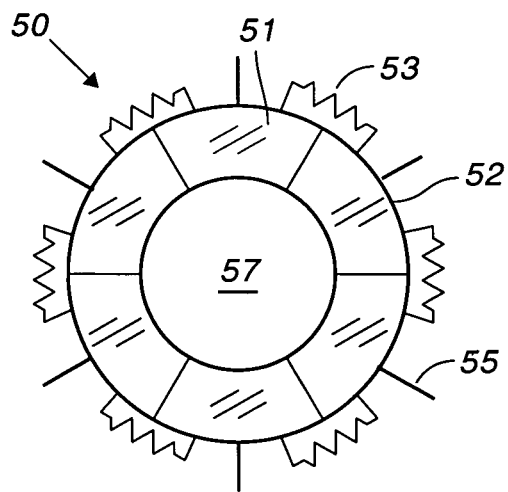
FIG. 5 is a plan view of a rotary capacitive sensor.

The electrodes in a capacitive sensor can have many configurations. FIG. 5 is a plan view of plurality of electrodes disposed in a circle on the same surface. Sensor 50 includes a plurality of electrodes, interconnected by resistors, to provide a "rotary" type of sensor. Electrode 51 is coupled to electrode 52 by resistor 53, which can be implemented as a screen printed conductor with low carbon content, which increases the resistivity of the conductor. A plurality of leads, such as lead 55, is used for sensing contact. Central area 57 can include a further electrode or be left blank. Referring also to FIG. 2, with central area 57 corresponding to key 24, electrode 51 corresponds to key 58, electrode 52 corresponds to key 58, and so on around central area 57 for a total of nine keys.

Figure 6:
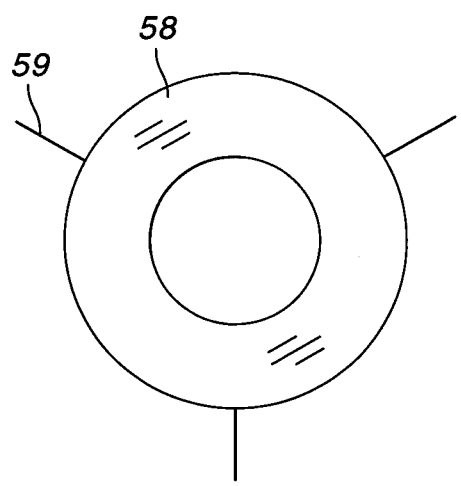
FIG. 6 is plan view of another rotary capacitive sensor.

FIG. 6 illustrates an alternative form of rotary sensor in which conductive annulus 58 is contacted by three electrodes, such as electrode 59. The number of electrodes is not critical. In this embodiment of the sensor, location is determined by sensing differences among the capacitances at the electrodes to determine location. The central aperture can overlie a dome switch, if desired, or be left empty.

Figure 7:
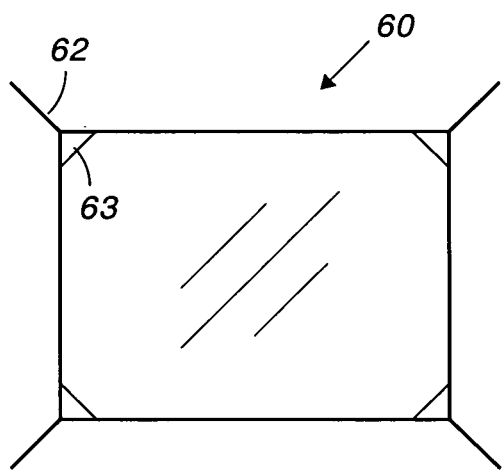
FIG. 7 is a plan view of a touch pad having corner connections to sense circuitry.

FIG. 7 illustrates an alternative embodiment for the capacitive sensor in which electrode 60 has several leads, such as lead 62, attached to contact area 63, which can simply be an area of overlap between lead 62 and electrode 60. By measuring capacitance or resistance, one can locate a touch on electrode 60 relative to the corners. Obviously, one does not actually touch an electrode. One touches the outer surface of the sensor, which is coated with a protective layer. Electrode 60 is particularly useful for slide sensors, such as slide 23 (FIG. 2).

In accordance with one aspect of the invention, at least conductive layers 41 and 43 are screen printed from ink containing particles of acicular ITO. Acicular ITO is known in the art as a transparent conductor; see U.S. Pat. No. 5,580,496 (Yukinobu et al.) and the divisional patents based thereon (U.S. Pat. Nos. 5,820,843, 5,833,941, 5,849,221). Acicular ITO has a fibrous structure composed of 2-5 µm thick by 15-25 µm long ITO needles. The needles are suspended in an organic resin, e.g. polyester.

Acicular ITO is different in kind from other forms of the material. A cured, screen printed layer of acicular ITO is approximately five times more conductive than conventional layers containing ITO powder but is about two thirds less conductive than sputtered ITO, which is more difficult to pattern than screen printable materials. Thus, acicular ITO can be formulated to provide a resistivity of $10^2$ to $10^5$ $\Omega/\Box$, for a capacitive sensor. Depending upon the longest dimension of the layer, or a portion of a layer if patterned, a resistivity of approximately $10^5$ $\Omega/\Box$ is preferred. Antimony tin oxide is less conductive than acicular ITO, is also suitable, and is less expensive than acicular ITO. The resistivity of the conductive layers in EL lamp 32 should be less than $10^2$ $\Omega/\Box$.

Figure 8:
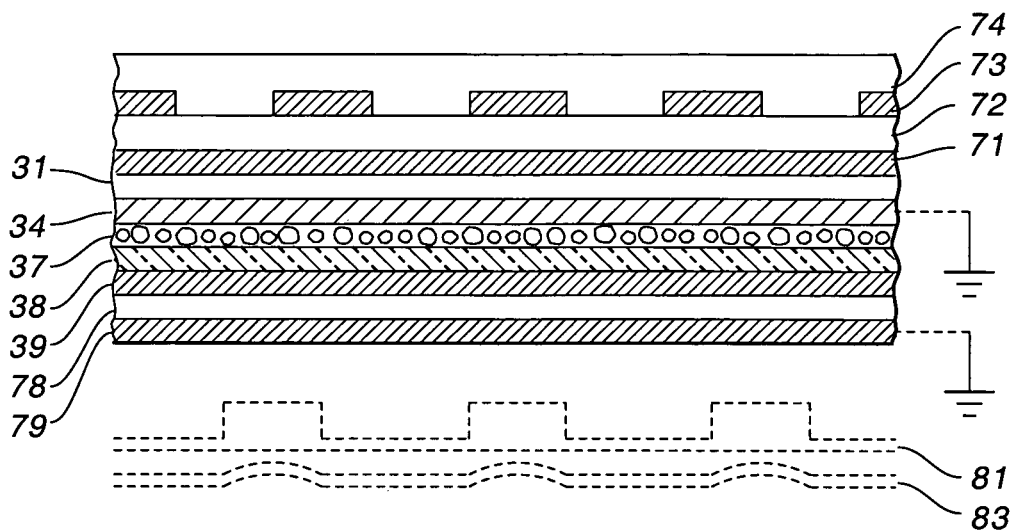
FIG. 8 is a cross-sectional view of a back lit capacitive sensor constructed in accordance with another aspect of the invention.

FIG. 8 is a cross-sectional view of a back lit capacitive sensor constructed in accordance with an alternative embodiment of the invention. In this embodiment, phosphor layer 37 is deposited on ITO layer 34 and layers 38 and 39 are deposited as described above. Conductive layer 79, which was middle electrode 36 in FIG. 3, overlies insulating layer 78 and is now a rear electrode. ITO layer 34 and rear electrode 79 are preferably grounded to provide an electrostatic shield between panel 32 and the capacitive sensor.

In portable electronic devices, an EL lamp is powered by an inverter that converts direct current from a battery into alternating current. In order for an EL lamp to glow sufficiently, a peak-to-peak voltage in excess of about one hundred and twenty volts is necessary. The frequency of the alternating current through an EL lamp affects the life of the lamp, with frequencies between 200 hertz and 1000 hertz being preferred. Operating efficiencies dictate higher switching frequencies. The result is that an EL lamp is pulsed at high frequency, tens of kilohertz, in a first polarity, then pulsed at high frequency in the opposite polarity to produce alternating current. The result is a high frequency AC field near the electrodes of an EL lamp.

Capacitive coupling between EL panel and an overlying capacitive sensor is prevented by grounded conductive layer 71. Insulating layer 72 separates conductive layer 71 from conductive layer 73. Conductive layer 73 is charged to provide a sense field. Protective layer 74 prevents damage to conductive layer 73.

As indicated by the dashed lines, a backlit capacitive touch sensor constructed in accordance with the invention can overlie a contact type of switch array, including elastic layer 81, which includes an array of pins for actuating the switches (not shown), and elastic layer 83, which contains a plurality of domes for providing tactile feedback. A switch is actuated by pushing downward on layer 74.

Contact switches and capacitive sensors would not normally occupy the same area. FIG. 8 is intended to illustrate that the layers can have some areas for capacitive sensing and some areas for contact switches. For example, in FIG. 2, area 24 can overlie a contact switch while areas 58, 85, 86, and 87 overlie capacitive sensors. A contact switch does not require software to operate. Thus, contact switches would be used for fixed function, basic operations, such as power on-off. The broad combination of an EL panel overlying contact switches is known in the art; e.g. see U.S. Pat. No. 5,950,808 (Tanabe et al.).

Figure 9:
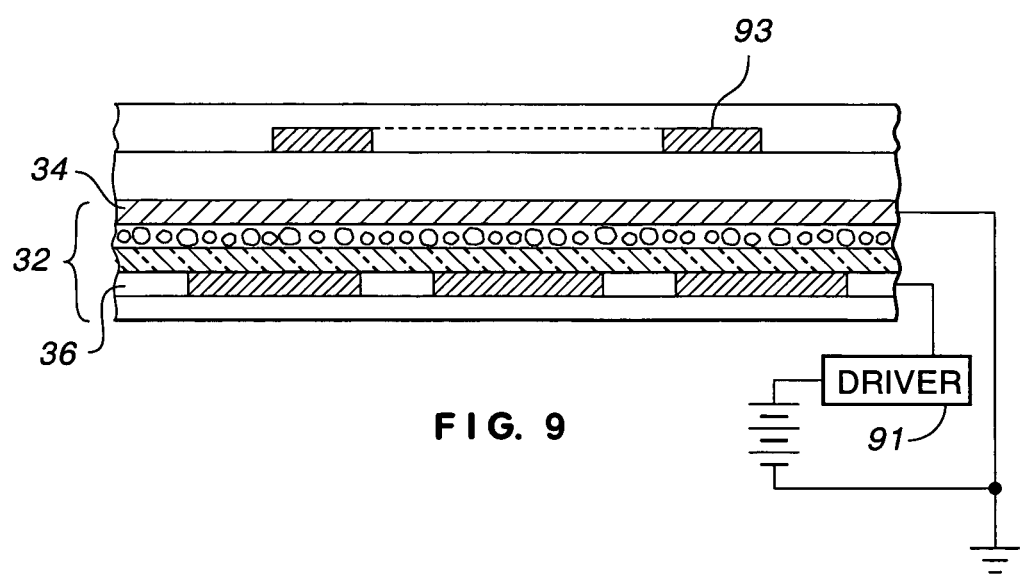
FIG. 9 is a cross-sectional view of a back lit capacitive sensor constructed in accordance with an alternative embodiment of the invention.

FIG. 9 is a cross-sectional view of a back lit capacitive sensor constructed in accordance with an alternative embodiment of the invention. The EL panel in this embodiment is intended to be driven by a single output, battery operated driver 91, such as disclosed in U.S. Pat. No. 5,313,141 (Kimball). The driver in the Kimball patent overcomes the difficulty of grounding one electrode of an EL lamp. The electrodes are usually left floating to simplify connection to a battery powered driver chip.

In FIG. 9, conductive layer 34 is grounded and serves two functions. Layer 34 acts as one electrode of EL panel 32 and acts as an electrostatic shield, preventing capacitive coupling to conductive layer 93, which represents a cross-section of annulus 58 (FIG. 6).

The invention thus provides a unitary, EL backlit, capacitive touch sensor in which the structure serves as both a switchpad and a display; i.e. as both an input device and an output device. Various materials are identified that provide optimal resistivities for transparent conductive layers.

Having thus described the invention, it will be apparent to those of skill in the art that various modifications can be made within the scope of the invention. For example, other layers can be added to the embodiment shown in FIG. 3, such as a fixed graphic overlay. A touch sensor and EL panel can be made from heat curable (solvent based) or uv curable resins. A very flexible substrate can be obtained by using a uv curable resin such as Lustercure Special Coat C, as sold by Kolorcure Corp. The substrate is formed on a release layer that supports the substrate while lamp materials (front conductor, phosphor, dielectric, rear conductor) are applied. Polyaniline or resin containing carbon nanotubes or other forms of carbon, see U.S. Pat. No. 6,627,689 (Iino et al.), can be used for the conductive layers.

What is claimed is:

1. A personal electronic device comprising:
   a display;
   a keypad;

wherein said keypad includes a capacitive touch sensor, an EL panel backlighting the capacitive touch sensor, and a grounded conductive layer in a unitary structure, said layer shielding the capacitive, touch sensor from the EL panel.

2. The personal electronic device as set forth in claim 1 wherein said capacitive touch sensor includes at least one conductive layer including a cured resin containing particles of antimony tin oxide.

3. The personal electronic device as set forth in claim 1 wherein said capacitive touch sensor includes at least one conductive layer including a cured conductive resin.

4. The personal electronic device as set forth in claim 1 wherein said capacitive touch sensor includes at least one conductive layer including a cured resin containing carbon nanotubes.

5. The personal electronic device as set forth in claim 1 wherein said capacitive touch sensor includes at least one conductive layer including a cured resin containing polyaniline.

6. The personal electronic device as set forth in claim 1 wherein said keypad includes at least one contact switch.

7. The personal electronic device as set forth in claim 1 wherein said grounded conductive layer is one electrode of said EL panel.

8. The personal electronic device as set forth in claim 7 wherein said electrode is substantially transparent.

9. The personal electronic device as set forth in claim 1 wherein said grounded conductive layer is the rear electrode of said EL panel.

10. The personal electronic device as set forth in claim 1 and further including cellphone circuitry, wherein said keypad is coupled to said cellphone circuitry to cause touch tones to be produced by said cellphone circuitry.

11. A personal electronic device comprising:
a display;
a keypad;
wherein said display includes a capacitive touch sensor, an EL panel backlighting the capacitive touch sensor, and a grounded conductive layer in a unitary structure, said layer shielding the capacitive touch sensor from the EL panel.

12. The personal electronic device as set forth in claim 11 wherein said grounded conductive layer is one electrode of said EL panel.

13. The personal electronic device as set forth in claim 12 wherein said electrode is substantially transparent.

14. The personal electronic device as set forth in claim 11 wherein said grounded conductive layer is the rear electrode of said EL panel.

* * * * *